United States Patent
Tanabe

(10) Patent No.: US 9,097,563 B2
(45) Date of Patent: Aug. 4, 2015

(54) FIELD APPARATUS

(75) Inventor: Itsuki Tanabe, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 121 days.

(21) Appl. No.: 14/008,529

(22) PCT Filed: Mar. 29, 2012

(86) PCT No.: PCT/JP2012/058328
§ 371 (c)(1),
(2), (4) Date: Jan. 8, 2014

(87) PCT Pub. No.: WO2012/133628
PCT Pub. Date: Oct. 4, 2012

(65) Prior Publication Data
US 2014/0109670 A1  Apr. 24, 2014

(30) Foreign Application Priority Data

Mar. 29, 2011 (JP) ................. 2011-072165

(51) Int. Cl.
G01D 11/24  (2006.01)
G01L 19/14  (2006.01)
G01P 1/02  (2006.01)

(52) U.S. Cl.
CPC ...... *G01D 11/24* (2013.01); *G05B 2219/25428* (2013.01)

(58) Field of Classification Search
CPC ........... G01D 11/24; G01L 19/14; G01P 1/02
USPC ........................................................ 73/431
See application file for complete search history.

(56) References Cited

U.S. PATENT DOCUMENTS

| 3,828,611 A * | 8/1974 | Shamlian et al. ........... 73/300 |
| 3,888,127 A * | 6/1975 | Shamlian et al. ........... 73/431 |
| 4,438,589 A | 3/1984 | Matsushiro |
| 8,468,893 B2 | 6/2013 | Fujiwara et al. |
| 2004/0129084 A1 | 7/2004 | Ikeda |
| 2007/0201192 A1* | 8/2007 | McGuire et al. ........... 361/600 |
| 2008/0274772 A1* | 11/2008 | Nelson et al. ............ 455/572 |

(Continued)

FOREIGN PATENT DOCUMENTS

| CN | 1512141 | 7/2004 |
| CN | 101430844 | 5/2009 |

(Continued)

OTHER PUBLICATIONS

Chinese Office Action dated Jun. 5, 2014, which issued during prosecution of Chinese Application No. 201280015465.3, which corresponds to the present application.

(Continued)

*Primary Examiner* — Lisa Caputo
*Assistant Examiner* — Jamel Williams
(74) *Attorney, Agent, or Firm* — Troutman Sanders LLP

(57) ABSTRACT

A field apparatus includes an apparatus case having an opening, a battery case that houses a battery and is mounted to an inner side of the apparatus case by being inserted into the apparatus case via the opening, and a mounting part that is provided on the inner side of the apparatus case and mounts the battery case such that its mounting direction can be modified in accordance with the installation direction of the apparatus case such that the battery is in a preset proper mounting direction.

7 Claims, 20 Drawing Sheets

(56) References Cited

U.S. PATENT DOCUMENTS

2009/0115689 A1     5/2009  Mitsutake
2011/0293979 A1*   12/2011  Igarashi .......................... 429/99
2012/0247214 A1    10/2012  Fujiwara et al.

FOREIGN PATENT DOCUMENTS

| CN | 201762042 | 3/2011 |
|---|---|---|
| JP | S58-136198 U | 9/1983 |
| JP | S58-193564 U | 12/1983 |
| JP | H5-27537 U | 4/1993 |
| JP | 2009-133755 A | 6/2009 |
| WO | 2010/131702 A1 | 11/2010 |

OTHER PUBLICATIONS

"A study on the membrane electrode assembly of solid polymer electrolyte water electrolytic cell" Apr. 15, 2009, pp. 47-48.
International Search Report, dated Jul. 3, 2012, which issued during the prosecution of International Patent Application No. PCT/JP2012/058328.
Written Opinion, dated Jul. 3, 2012, which issued during the prosecution of International Patent Application No. PCT/JP2012/058328.
International Preliminary Report on Patentability, dated Oct. 10, 2013, which issued during the prosecution of International Patent Application No. PCT/JP2012/058328.

* cited by examiner

FIG. 10

| LEFT MOUNTING PART 21I | RIGHT MOUNTING PART 21J | RELATIVE MOUNTING DIRECTION | ACTUATED DETECTION SWITCH |
|---|---|---|---|
| 11C | 11B | Q1 | 31A |
| 11D | 11A | Q2 | 31B |
| 11A | 11D | Q3 | 31C |
| 11B | 11C | Q4 | 31D |

FIG. 12

| ACTUATED DETECTION SWITCH | ANTENNA MOUNTING PART | RELATIVE MOUNTING DIRECTION | ACTUATED DETECTION SWITCH |
|---|---|---|---|
| 32A | P1 | Q1 | 31A |
| 32B | P2 | Q2 | 31B |
| 32C | P3 | Q3 | 31C |

FIG. 16

| LEFT MOUNTING PART 21K | RIGHT MOUNTING PART 21L | ACTUATED DETECTION SWITCH | RELATIVE MOUNTING DIRECTION | RELATIVE MOUNTING DIRECTION | ACTUATED DETECTION SWITCH |
|---|---|---|---|---|---|
| 14C | 14B | 33A | R1 | Q1 | 31A |
| 14D | 14A | 33B | R2 | Q2 | 31B |
| 14A | 14D | 33C | R3 | Q3 | 31C |
| 14B | 14C | 33D | R4 | Q4 | 31D |

FIELD APPARATUS

CROSS REFERENCE TO RELATED APPLICATIONS

This is a U.S. national phase application under 35 U.S.C. §371 of International Patent Application No. PCT/JP2012/058328, filed on Mar. 29, 2012, and claims benefit of priority to Japanese Patent Application No. 2011-072165, filed on Mar. 29, 2011. The International Application was published on Oct. 4, 2012, as International Publication No. WO 2012/133628 under PCT Article 21(2). The entire contents of these applications are hereby incorporated herein by reference.

FIELD OF THE INVENTION

The present invention relates to a field apparatus that is mounted to a piece of equipment in a plant and the like and that operates on a built-in battery.

BACKGROUND

With equipment in a plant and the like, there are cases wherein, as a field apparatus that measures a physical quantity, such as pressure, flow volume, and temperature, a field apparatus is used that operates a circuit using an internal battery and both measures a physical quantity and performs data communication to provide notification of the measurement value. See, for example, Japanese Unexamined Patent Application Publication No. 2009-133755.

In a field apparatus that operates on a built-in battery of this type, it is necessary to replace the built-in battery in accordance with the lifespan of the built-in battery, and therefore a maintenance workload arises.

The maintenance of a field apparatus in a plant involves the planning of production, the adjustment of schedules, the procurement of replacement equipment, and the securing of maintenance work personnel and staffing, and consequently the burden and cost of plant management related to the performance of maintenance each time is large. Consequently, while it is desirable to avoid the risk of production stoppages owing to mechanical failures, it is also desirable to, as much as possible, not perform unnecessary maintenance work and to reduce the number of times that maintenance is performed. Accordingly, in order to perform maintenance wherein parts, such as batteries, are replaced efficiently all at once, it is preferable that the lifespans of replacement parts are well defined and that the lifespans of multiple replacement parts are in sync.

However, there are uncertainties in the lifespans of batteries, and it is also often the case that batteries cannot be used for the full life defined in the specification of the batteries. Consequently, to reduce production risk, the plant manager either replaces batteries based on a period that is shorter than the lifespan, or identifies the lifespan of each individual battery, determines an appropriate timing for the replacement of each battery, and replaces the batteries accordingly. In the case of the former, even a battery that has not yet reached the end of its life and therefore does not need to be replaced is also replaced. Moreover, in the case of the latter, it is troublesome to identify the lifespan of each individual battery. Accordingly, in either case, the number of times that maintenance is performed increases, and the workload associated therewith increases, which are problems.

The present invention is conceived in order to solve such problems, and it is an aspect of the present invention to provide a field apparatus that can reduce the workload needed to perform the maintenance of batteries.

SUMMARY

To achieve the abovementioned aspect, a field apparatus according to the present invention includes an apparatus case that has an opening, a battery case that houses a battery and is mounted to an inner side of the apparatus case by being inserted into the apparatus case via the opening, and a mounting part that is provided on the inner side of the apparatus case and mounts the battery case such that its mounting direction can be modified in accordance with the installation direction of the apparatus case such that the battery is in a preset proper mounting direction.

According to the present invention, the battery case can be mounted, with its mounting direction modifiable, in accordance with the installation direction of the apparatus case such that the mounting direction of the batteries is in the proper mounting direction, which is oriented in a constant direction with respect to the vertical direction. Thereby, variation in the lifespan of the batteries built into the field apparatus is suppressed, and the batteries reach the end of their lives at substantially the same time. Accordingly, it is possible to reduce the overall number of times that maintenance is needed to replace batteries, and thereby to reduce the workload needed for built-in battery maintenance.

BRIEF DESCRIPTION OF THE DRAWINGS

FIG. 10 is an explanatory diagram that shows the correspondence relationship between a battery mounting direction and an actuated detection switch.

FIG. 12 is an explanatory diagram that shows the correspondence relationship between an antenna mounting direction and the battery mounting direction.

FIG. 16 is an explanatory diagram that shows the correspondence relationship between a display unit mounting direction and the actuated detection switch.

DETAILED DESCRIPTION

Figure 1A:
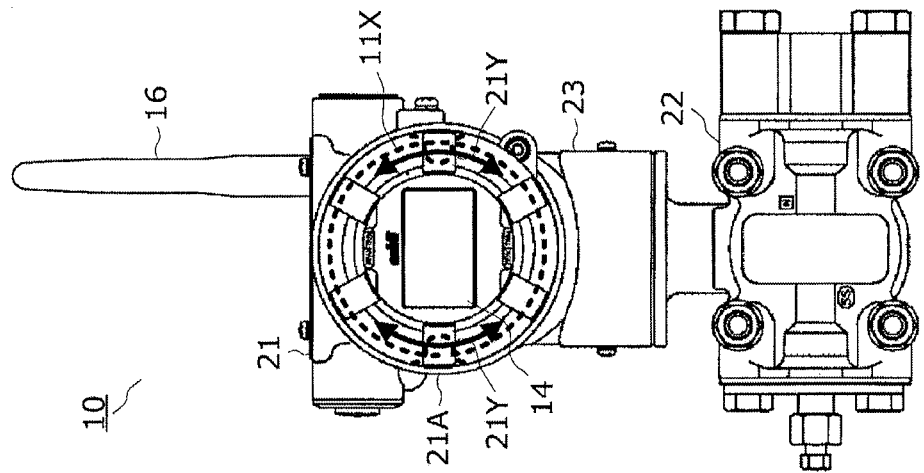
FIG. 1A is a front view that shows the configuration of a field apparatus according to Example.
Figure 1B:
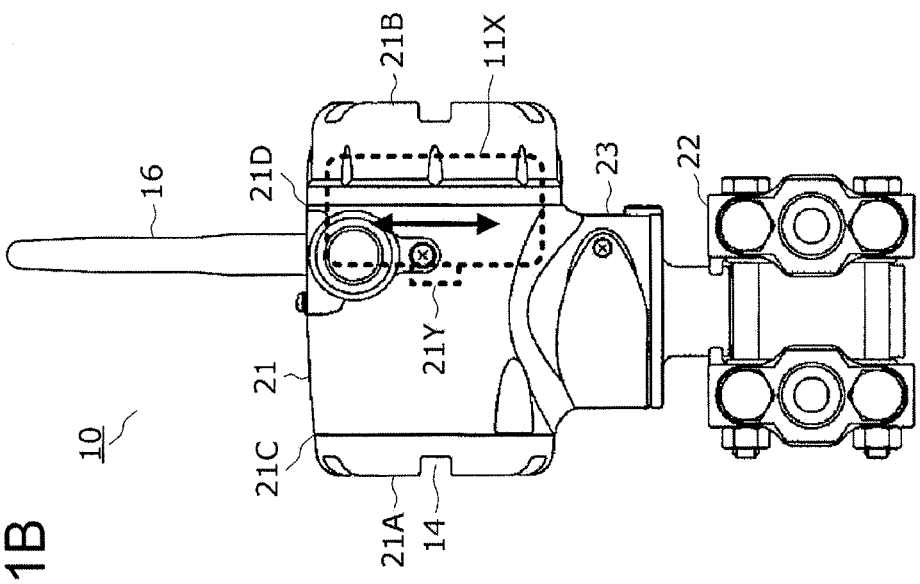
FIG. 1B is a side view that shows the configuration of the field apparatus according to the Example.
Figure 2:
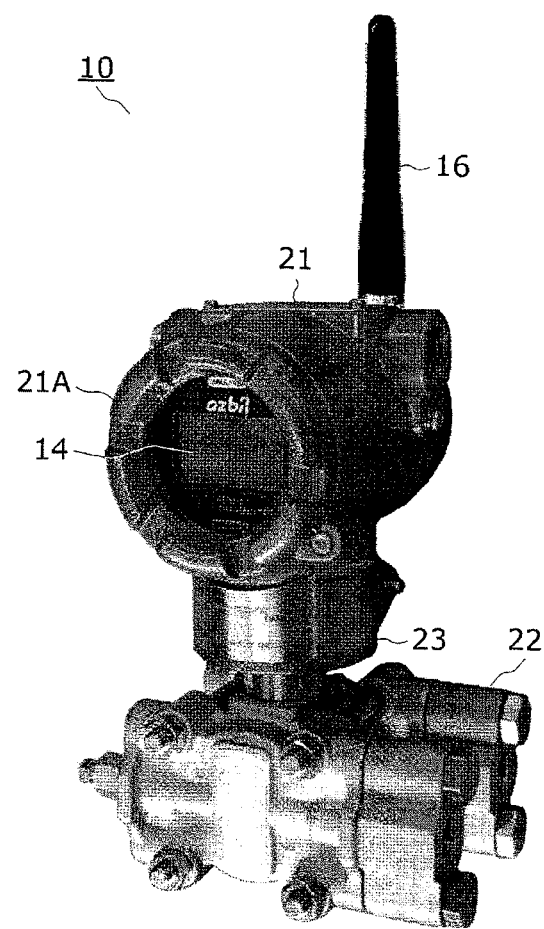
FIG. 2 is an external view of the field apparatus according to the Example.

The lifespan of a battery is greatly affected by its installation attitude. In the case of a field apparatus, the installation attitude (i.e., the vertical and horizontal directions of the field apparatus itself when mounted) is not necessarily limited to being maintained constant. Because the batteries themselves are built in and mounted only in directions designed in accordance with the main body of the field apparatus, the direction of the batteries is unfortunately dependent upon and determined by the vertical and horizontal directions of the field apparatus itself. Furthermore, the inventor observed that, because the battery lifespan fluctuates depending on its direction, this becomes one of the uncertainties of battery lifespan.

Furthermore, it is conceivable that the abovementioned uncertainties can be reduced by adopting a structure wherein the built-in mounting direction of the batteries mounted to the main body of the field apparatus can be selectively modified even after the field apparatus itself has been mounted in the plant. Furthermore, because plants also have environments that are subject to the vibrations of compressors and the like, it is preferable if the batteries can be reliably fixed even in the case of a structure wherein the built-in mounting direction of the batteries can be selectively modified. For example, by setting the selectively modifiable directions to a minimum of 90° (corresponding to vertical and horizontal), a reliable mounting structure is achieved at low cost, which is ideal.

Next, the examples of the present invention will be explained, referencing the drawings.

EXAMPLE

First, a field apparatus 10 according to Example of the present invention will be explained, referencing FIG. 1A, FIG. 1B, FIG. 2, FIG. 3A, and FIG. 3B.

The field apparatus 10 is used by equipment in a plant and the like and measures a physical quantity, such as pressure, flow volume, and temperature.

The field apparatus 10 includes an apparatus case 21, a front cover 21A, a rear cover 21B, a detection part 22, and a coupling part 23.

The apparatus case 21 is a tubular or box shaped metal casing with various electronic circuits built in; furthermore, the front cover 21A is mounted to one opening 21C, and the rear cover 21B is mounted to another opening 21D.

The detection part 22 is connected to the apparatus case 21 at the vicinity of the center thereof, with the coupling part 23 interposed therebetween; furthermore, a physical quantity related to a target, such as a fluid, a gas, and the like guided to the detection part 22, is detected by a sensor that is built into the detection part 22.

A battery case 11X, which houses batteries 11, is mounted inside the apparatus case 21 on the opening 21D side, and a display panel 14X, which houses a display unit 14, is mounted inside the apparatus case 21 on the opening 21C side.

In addition, an antenna 16 for wireless communication is fixed to an outer surface of the apparatus case 21.

Figure 3A:
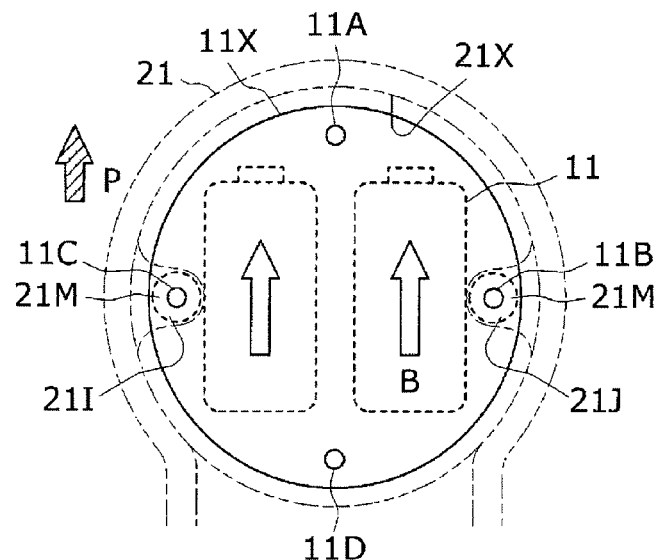
FIG. 3A is a front cross sectional view that shows the principal battery mounting parts of the field apparatus according to the Example.
Figure 3B:
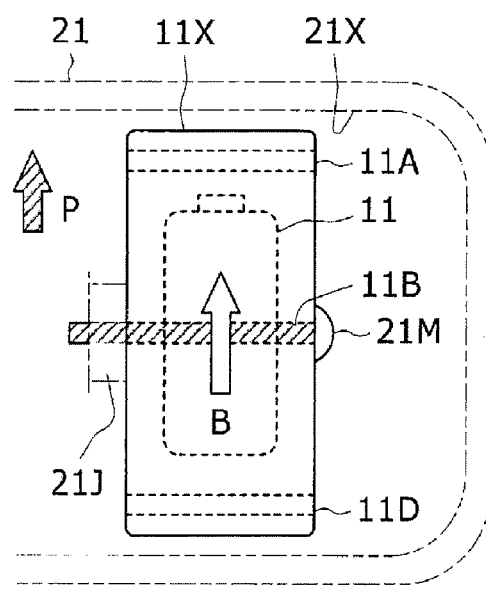
FIG. 3B is a side cross sectional view that shows the principal battery mounting parts of the field apparatus according to the Example.

As shown in FIG. 3A and FIG. 3B, two of the batteries 11 are housed in the battery case 11X with their electrode directions aligned. A plurality of holes 11A, 11B, 11C, 11D is formed concyclicly at a peripheral part of the battery case 11X.

Moreover, mounting parts 21I, 21J, which are for mounting the battery case 11X, are provided to an inner wall 21X of the apparatus case 21.

The mounting parts 21I, 21J are formed by causing mutually opposing parts of the inner wall 21X to protrude; furthermore, screws 21M, which pass through the holes 11A, 11B, 11C, 11D of the battery case 11X are screwed through screw holes formed in the mounting parts 21I, 21J, and thereby the battery case 11X is screwed to the inner wall 21X.

Here, the mounting parts 21I, 21J are provided such that they are mutually opposing in the lateral directions of the inner wall 21X, and the four holes 11A, 11B, 11C, 11D corresponding to the mounting parts 21I, 21J are provided in the battery case 11X at mutually orthogonal angles.

Thereby, it is possible to rotate the battery case 11X and mount the battery case 11X to the inner side of the apparatus case 21 at an arbitrary mounting direction from among four types of mounting directions by selecting two holes from among the holes 11A, 11B, 11C, 11D that are screwed through to the mounting parts 21I, 21J.

Figure 4A:
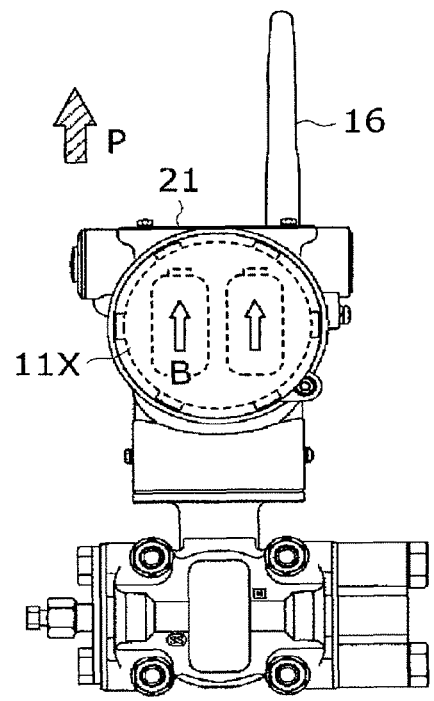
FIG. 4A is an explanatory diagram that shows the mounting direction of the batteries (for the case wherein the field apparatus is installed in an upright state).

As shown in FIG. 4A, if the field apparatus 10 is installed in the upright state, namely, if the apparatus case 21 is installed in a state wherein it is located above the detection part 22, then, as in FIG. 3A discussed above, mounting can be effected such that a battery mounting direction B of the batteries 11 is in a proper mounting direction P by screwing through the hole 11C to the mounting part 21I and screwing through the hole 11B to the mounting part 21J.

Here, an exemplary case will be explained wherein the direction leading from the center position to a positive electrode 11P of each of the batteries 11 is defined as the battery mounting direction B, and the vertically upward direction is defined as the proper mounting direction P. Furthermore, the mounting direction that obtains the longest lifespan of the batteries 11 is determined by factors such as the shape, the internal structure, and the like of the batteries 11, and consequently the mounting direction should be predetermined in accordance with the classification of the batteries to be used.

Figure 4B:
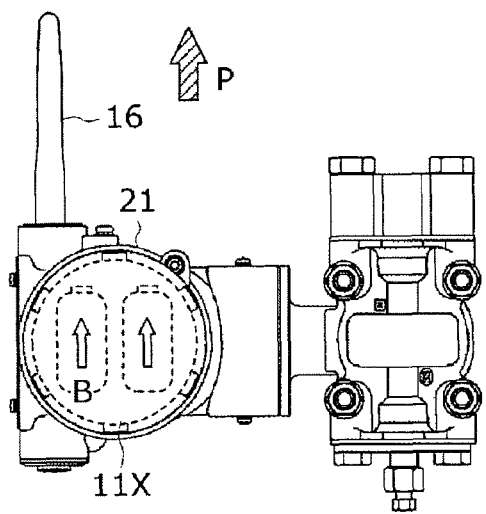
FIG. 4B is an explanatory diagram that shows the mounting direction of the batteries (for the case wherein the field apparatus is installed in a sidelong state).

Moreover, as shown in FIG. 4B, if the field apparatus 10 is installed in a sidelong state, namely, if the apparatus case 21 is installed in the state wherein it is located on the left side of the detection part 22, then, if the battery case 11X has been mounted in the same mounting direction as in FIG. 3A discussed above, the battery mounting direction B will face toward the left side and differ from the proper mounting direction P. In such a case, mounting can be effected with the battery mounting direction B of the batteries 11 in the proper mounting direction P by screwing through the hole 11D to the mounting part 21I and screwing through the hole 11A to the mounting part 21J.

Accordingly, according to the present example, the battery case 11X can be mounted, with its mounting direction modifiable, in accordance with the installation direction of the apparatus case 21 such that the mounting direction of the batteries 11 is in the proper mounting direction P, which is oriented in a constant direction with respect to the vertical direction.

The present example explained an exemplary case wherein four of the holes 11A, 11B, 11C, 11D are provided in the battery case 11X and four types of mounting directions can be selected, but the present invention is not limited thereto as long as the holes are formed such that they match the installation directions of the field apparatus 10. For example, if the field apparatus 10 is installed in either the left or the right sidelong state, then only the holes 11A, 11D should be provided and two types of mounting methods, namely, the left type and the right type, should be made selectable. In addition, if, for example, the field apparatus 10 is installed at 45° intervals, then eight of the holes should be formed, one hole every 45°, in the battery case 11X.

In addition, the above explained an exemplary case wherein any of the mutually opposing holes provided in the battery case 11X is selected for screwing through, but a configuration may be adopted such that any of the mounting parts provided to the inner wall 21X of the apparatus case 21 is selected for screwing into. Specifically, even if two of the holes are formed in the battery case 11X and four of the mounting parts are formed, one mounting part every 90°, in the inner wall 21X of the apparatus case 21, four types of mounting directions can be selected as in the configuration shown in FIG. 3A and FIG. 3B.

Furthermore, the number, angle, and the like of the holes of the battery case 11X and the mounting parts the inner wall 21X of the apparatus case 21 are not limited to these examples, but the number, the angle, and the like each should be selected in accordance with the relationship between the installation direction and the proper mounting direction of the field apparatus 10.

Another Example

Figure 5:
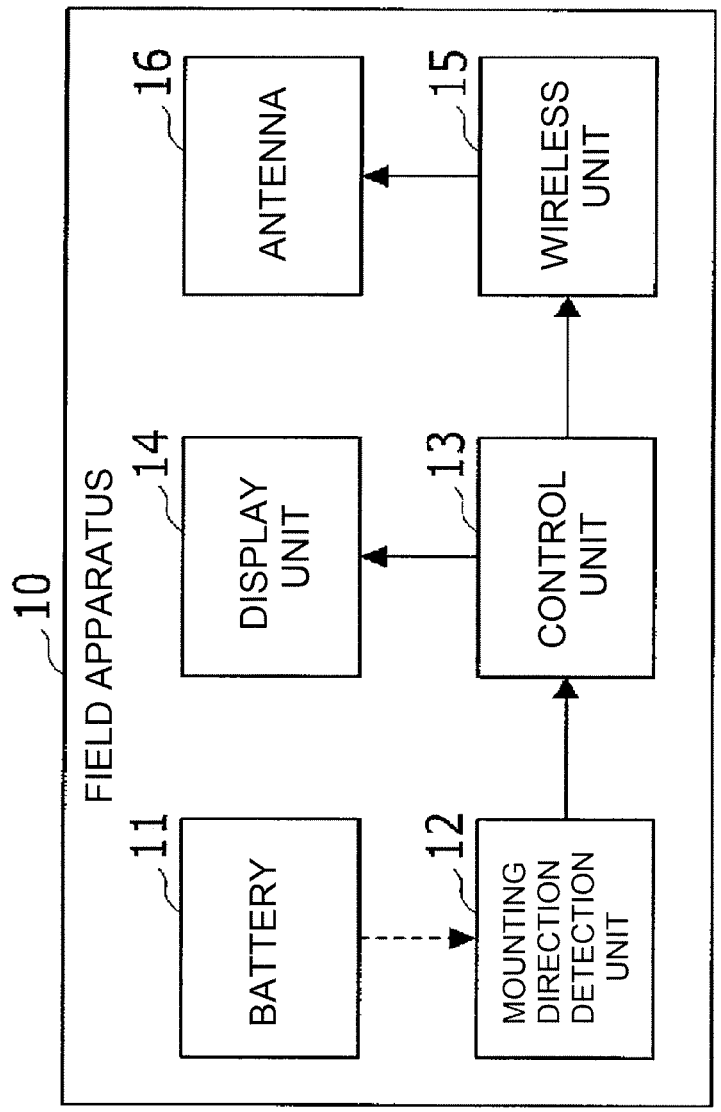
FIG. 5 is a functional block diagram of the field apparatus according to Another Example.
Figure 6A:
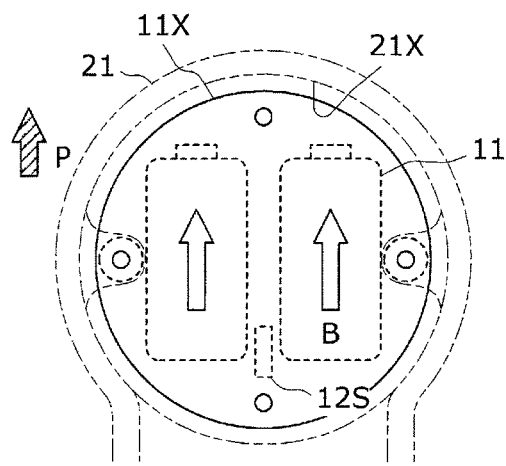
FIG. 6A is a front cross sectional view that shows the mounting of an acceleration sensor.
Figure 6B:
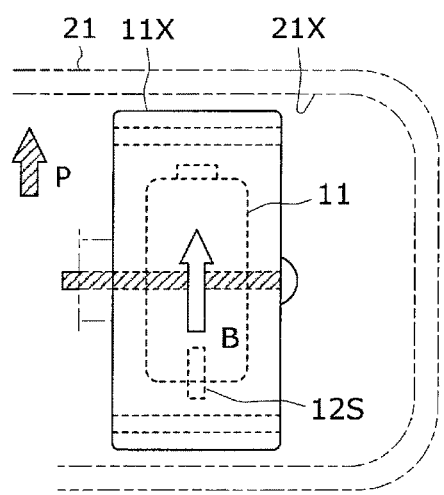
FIG. 6B is a side cross sectional view that shows the mounting of the acceleration sensor.

Next, the field apparatus 10 according to Another Example of the present invention will be explained, referencing FIG. 5, FIG. 6A, and FIG. 6B.

The present example explains a case wherein, in addition to the configuration of the Example, a mounting direction detection unit 12 is provided that detects the mounting direction of the batteries 11 and explains a case wherein an alarm is issued if the battery mounting direction differs from the proper mounting direction.

As an electronic circuit, the field apparatus 10 is provided with the mounting direction detection unit 12, a control unit 13, the display unit 14, a wireless unit 15, and the antenna 16.

The mounting direction detection unit 12 has a function that detects the mounting direction of the batteries 11 (i.e., the battery case 11X). As an example of the mounting direction detection unit 12, an acceleration sensor 12S should be mounted to the battery case 11X, and the battery mounting direction B with respect to the vertical direction should be detected based on the output from the acceleration sensor 12S.

The control unit 13 includes a CPU, a special purpose control circuit, and the like, and has a function that acquires a detection result from the sensor (not shown) of the detection part 22, a function that transmits a detection result from the wireless unit 15 via wireless radio waves, and a function that displays the detection result using the display unit 14.

In addition thereto, the control unit 13 has a function that verifies whether the battery mounting direction B detected by the mounting direction detection unit 12 is in the proper mounting direction P, a function that, if the battery mounting direction B differs from the proper mounting direction P, issues an alarm by transmitting alarm information from the wireless unit 15 via wireless radio waves, and a function that, if the battery mounting direction B differs from the proper mounting direction P, issues an alarm by displaying an alarm using the display unit 14.

The display unit 14 includes a display apparatus, such as an LED, an LCD, and the like, and has a function that displays various information, such as the detection result, an alarm, and the like, in accordance with an instruction from the control unit 13.

The wireless unit 15 includes a special purpose wireless communication circuit and has a function that transmits, from the antenna 16 via wireless radio waves, various information, such as a detection result, an alarm, and the like, in accordance with an instruction from the control unit 13.

Furthermore, other constituent elements of the field apparatus 10 according to the present example are the same as those in the Example, and a detailed explanations thereof are omitted herein.

Figure 7:
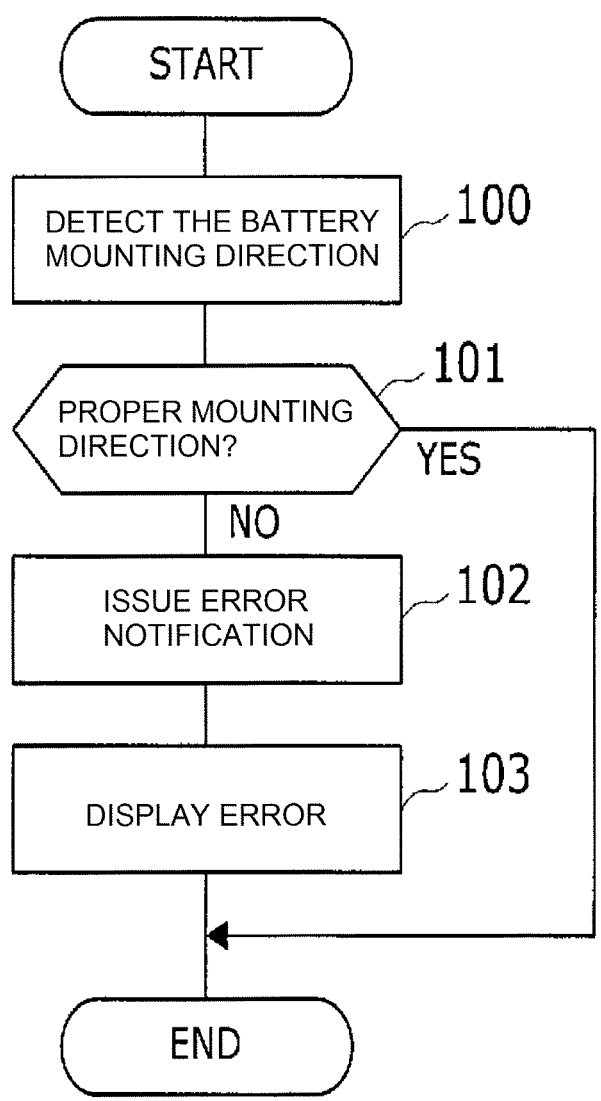
FIG. 7 is a flow chart that shows a battery mounting direction determination process according to the Another Example.

Next, the operation of the field apparatus 10 according to the present example will be explained, referencing FIG. 7.

First, the control unit 13 detects the battery mounting direction B by controlling the mounting direction detection unit 12 (i.e., a step 100) and compares with the proper mounting direction P, which is preset, the detected battery mounting direction B (i.e., a step 101). At this time, if the battery mounting direction B has been detected using an acceleration sensor, then angles in three axial directions are obtained as the detection result. Accordingly, it is possible to verify whether the battery mounting direction B is in the proper mounting direction P by determining whether the detection result is included in the angular range that indicates the preset proper mounting direction P.

Here, if the detection result is included in the angular range that indicates the preset proper mounting direction P and the battery mounting direction B is therefore in the proper mounting direction P (YES in step 101), then the control unit 13 does not perform an alarm notification process and terminates the sequence in the battery mounting direction determination process.

However, if it is not included in the angular range that indicates the preset proper mounting direction P and the battery mounting direction B is therefore not in the proper mounting direction P (i.e., NO in step 101), then, as an alarm notification process, the control unit 13 transmits alarm information from the wireless unit 15 via wireless radio waves (i.e., a step 102), displays an alarm using the display unit 14 (i.e., a step 103), and then terminates the sequence of the battery mounting direction determination process.

Thus, according to the present example, if the batteries 11 are mounted such that their mounting direction is mistakenly set in a direction that differs from the proper mounting direction P, then alarm information will automatically be transmitted from the field apparatus 10 to a host apparatus (not shown) such as a controller, or an alarm will be displayed using the display unit 14 of the field apparatus 10, making it possible for a worker to appropriately handle the problem.

Furthermore, the angular range that indicates the proper mounting direction P should be preset considering the relationship between the angular range and the degree of variation in the battery lifespan, the relationship between the degree of variation in the battery lifespan and the actual maintenance period, and the like.

Yet Another Example

Next, the field apparatus 10 according to yet another example of the present invention will be explained, referencing FIG. 8A and FIG. 8B.

The Another Example explained an exemplary case wherein the battery mounting direction of the batteries 11 is detected using the acceleration sensor. The present example explains a case wherein the relative battery mounting direction with respect to the field apparatus 10 is detected using a detection switch, such as a mechanical switch, an optical switch, and the like.

In the present example, the mounting direction detection unit 12 has, in addition to those functions described in the Example, a function that detects, as the battery mounting direction, the relative mounting direction of the battery case 11X with respect to the apparatus case 21.

In addition, the control unit 13 has a function that verifies whether the battery mounting direction B is in the proper mounting direction P by determining whether the battery mounting direction detected by the mounting direction detection unit 12 is in an alignment direction that indicates the proper mounting direction P viewed from the field apparatus 10.

Figure 8A:
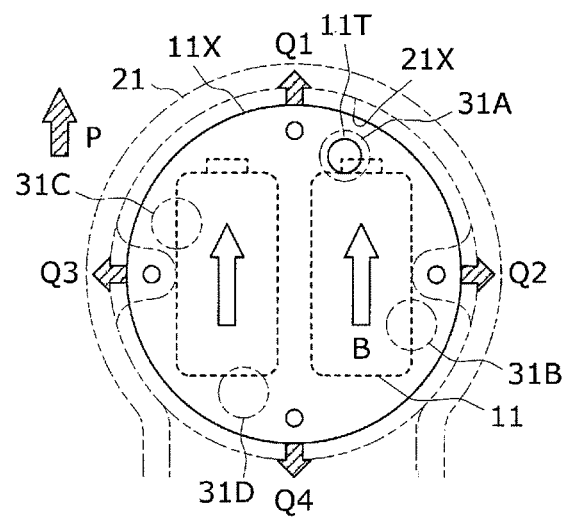
FIG. 8A is a front cross sectional view that shows the principal battery mounting direction detection parts of the field apparatus according to Yet Another Example.
Figure 8:
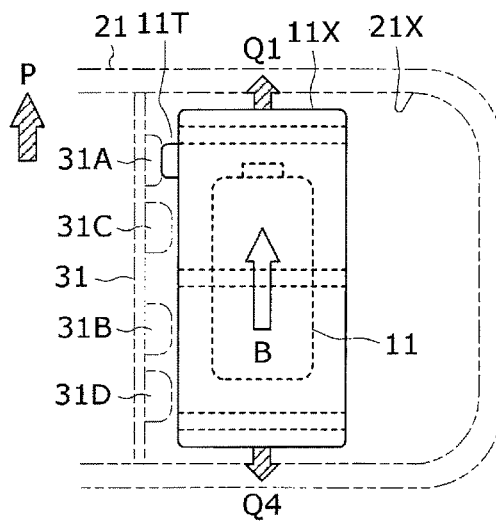
FIG. 8B is a side cross sectional view that shows the principal battery mounting direction detection parts of the field apparatus according to the Yet Another Example.

As shown in FIG. 8A and FIG. 8B, in the present example, a protruding part 11T is provided to the surface of the battery case 11X on the mounting parts 211, 21J side. Moreover, a board 31 (i.e., a PCB) is fixed inside the apparatus case 21 such that it opposes the battery case 11X, and four detection switches 31A, 31B, 31C, 31D, which constitute the mounting direction detection unit 12, are mounted on the board 31.

Each of the detection switches 31A, 31B, 31C, 31D is mounted at a location at which it will contact the protruding part 11T and actuate when the battery case 11X is screwed to the mounting parts 211, 21J.

Furthermore, other constituent elements of the field apparatus 10 according to the present example are the same as those of the Example, and therefore detailed descriptions thereof are omitted herein. In addition, operation is also the same as that of the Another Example, outside of the fact that, in step 100 shown in FIG. 7, the battery mounting direction is detected using the detection switches 31A, 31B, 31C, 31D instead of the acceleration sensor, and therefore detailed description thereof is omitted herein.

Here, four relative mounting directions, i.e., Q1, Q2, Q3, Q4, are defined as the battery mounting directions with respect to the field apparatus 10.

Namely, the relative mounting direction Q1 indicates the direction in which the battery mounting direction B is oriented in the state wherein the holes 11C, 11B are screwed through to the mounting parts 211, 21J, respectively; in this case, the detection switch 31A is actuated by the protruding part 11T. In addition, the relative mounting direction Q2 indicates the direction in which the battery mounting direction B is oriented in the state wherein the holes 11D, 11A are screwed through to the mounting parts 211, 21J, respectively; in this case, the detection switch 31B is actuated by the protruding part 11T.

Likewise, the relative mounting direction Q3 indicates the direction in which the battery mounting direction B is oriented in the state wherein the holes 11A, 11D are screwed through to the mounting parts 211, 21J, respectively; in this case, the detection switch 31C is actuated by the protruding part 11T. In addition, the relative mounting direction Q4 indicates the direction in which the battery mounting direction B is oriented in the state wherein the holes 11B, 11C are screwed through to the mounting parts 211, 21J, respectively; in this case, the detection switch 31D is actuated by the protruding part 11T.

As shown in FIG. 4A and FIG. 4B discussed above, there are cases where the field apparatus 10 is installed in a direction other than the upright state, but the field apparatus 10 is more often installed in a prefixed direction, such as the upright state. In such a case, the proper mounting direction P is fixedly determined with respect to the installation direction of the field apparatus 10. For example, as shown in FIG. 4A, if the field apparatus 10 is installed in the upright state, then the alignment direction that indicates the proper mounting direction viewed from the field apparatus 10 becomes the relative mounting direction Q1 in FIG. 8A and FIG. 8B.

Accordingly, if it is possible to verify, by the detection switches, whether the battery case 11X is mounted to the field apparatus 10 in the relative mounting direction Q1, then it is possible to verify whether there is an error in the mounting direction of the batteries 11.

In the example shown in FIG. 8A and FIG. 8B, the actuation of the detection switch 31A pressed by the protruding part 11T is detected by the mounting direction detection unit 12, and therefore the control unit 13 can verify, based on a table that describes the correspondence relationship between the battery mounting direction and the actuated detection switch as shown in FIG. 10, that the batteries are oriented in the relative mounting direction Q1. Accordingly, in this case, the battery mounting direction coincides with the alignment direction, namely, the relative mounting direction Q1, when the field apparatus 10 is installed in the upright state; as a result, it is determined that the battery mounting direction is in the proper mounting direction.

Thus, according to the present example, if the field apparatus 10 is installed in a prefixed direction, then it is possible to verify whether there is an error in the mounting direction of the batteries 11 based on the relative mounting direction of the batteries 11 with respect to the apparatus case 21, even if the angles in three axial directions, using the vertical direction as a reference, cannot be detected as explained in the Another Example.

Accordingly, it is possible to verify whether there is an error in the mounting direction of the batteries 11 even with the low cost detection switches, without the need for the comparatively high cost acceleration sensor.

Further Example

Next, the field apparatus 10 according to Further Example of the present invention will be explained, referencing FIG. 11 and FIG. 12.

The Yet Another Example explained an exemplary case wherein the relative battery mounting direction of the batteries 11 with respect to the field apparatus 10 is detected using the detection switches. The present example explains a case wherein whether the battery mounting direction is in the proper mounting direction is verified by detecting the mounting direction of the antenna 16 and comparing that with the battery mounting direction.

Generally, it is often the case that the antenna 16 is provided upright in the vertically upward direction in order to maintain the radio wave propagation state in a satisfactory state, but the mounting direction of the antenna 16 is not governed by the installation direction of the field apparatus 10. Consequently, if the mounting direction of the antenna 16 is detected, then the vertical direction can be identified and, as a result, it is possible to identify the alignment direction that indicates the proper mounting direction P viewed from the field apparatus 10.

In the present example, the mounting direction detection unit 12 has a function that detects the antenna mounting direction of the antenna mounted to the apparatus case 21.

The control unit 13 has a function that verifies whether the battery mounting direction is in the proper mounting direction by comparing the antenna mounting direction detected by the mounting direction detection unit 12 and the battery mounting direction.

As a configuration for providing the antenna 16 upright in the vertically upward direction even if the installation direction of the field apparatus 10 changes, a plurality of connecting holes is provided in the outer surface of the apparatus case 21.

In the present example, detection switches 32A, 32B, 32C, which constitute the mounting direction detection unit 12, are provided in these connecting holes, and the presence of the mounting of the antenna 16 is detected with respect to the connecting holes. Accordingly, in FIG. 11, if the field apparatus 10 is installed in the upright state, then an antenna 16A is connected to the apparatus case 21, and consequently the detection switch 32A is actuated. However, if the field apparatus 10 is installed in the sidelong state, then an antenna 16B or an antenna 16C is connected to the apparatus case 21, and consequently the detection switch 32B or the detection switch 32C is actuated.

Figure 11:
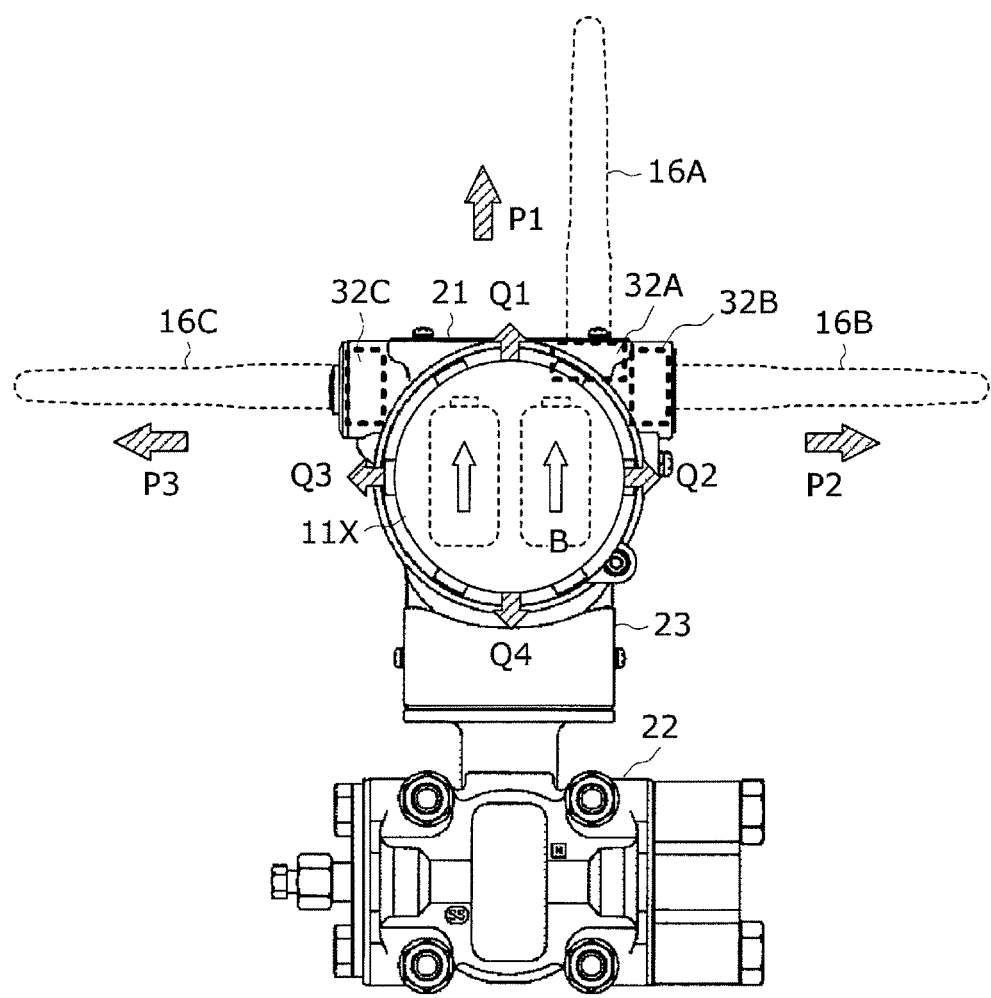
FIG. 11 is a front view that shows the field apparatus according to Further Example.

Here, if the direction in which the antenna 16 is oriented is in the proper mounting direction P of the batteries 11 and the field apparatus 10, whereto the antenna 16A is connected, is installed in the upright state as shown in FIG. 11, then the proper mounting direction becomes P1; furthermore, to be mounted in the proper mounting direction P1, the batteries 11 clearly should be mounted to the field apparatus 10 in the relative mounting direction Q1.

In addition, if the field apparatus 10, whereto the antenna 16B is connected, is installed in the left sidelong state, then the proper mounting direction becomes P2; furthermore, to be mounted in the proper mounting direction P2, the batteries 11 clearly should be mounted to the field apparatus 10 in the relative mounting direction Q2. Likewise, if the field apparatus 10, whereto the antenna 16C is connected, is installed in the right sidelong state, then the proper mounting direction becomes P3; furthermore, to be mounted in the proper mounting direction P3, the batteries 11 clearly should be mounted to the field apparatus 10 in the relative mounting direction Q3.

Thereby, as shown in FIG. 11, if the connection of the antenna 16A is detected by the actuation of the detection switch 32A, then, if the actuation of the detection switch 31A is verified, it is possible to verify that the batteries 11 are oriented in the proper mounting direction P1. In addition, if the connection of the antenna 16B is detected by the actuation of the detection switch 32B, then, if the actuation of the detection switch 31B is verified, it is possible to verify that the batteries 11 are oriented in the proper mounting direction P2. If the connection of the antenna 16C is detected by the actuation of the detection switch 32C, then, if the actuation of the detection switch 31C is verified, it is possible to verify that the batteries 11 are oriented in the proper mounting direction P3.

Accordingly, the control unit 13 can verify whether the battery mounting direction is in the proper mounting direction by comparing, based on the table that describes the correspondence relationship between the antenna mounting direction and the battery mounting direction as in FIG. 12, the actuation states of the detection switches 31A, 31B, 31C that detect the battery mounting direction B of the battery case 11X with the actuation states of the detection switches 32A, 32B, 32C that detect the antenna mounting direction of the antenna 16. Furthermore, here, it is assumed that the field apparatus 10 is not installed in the inverted state.

Figure 13:
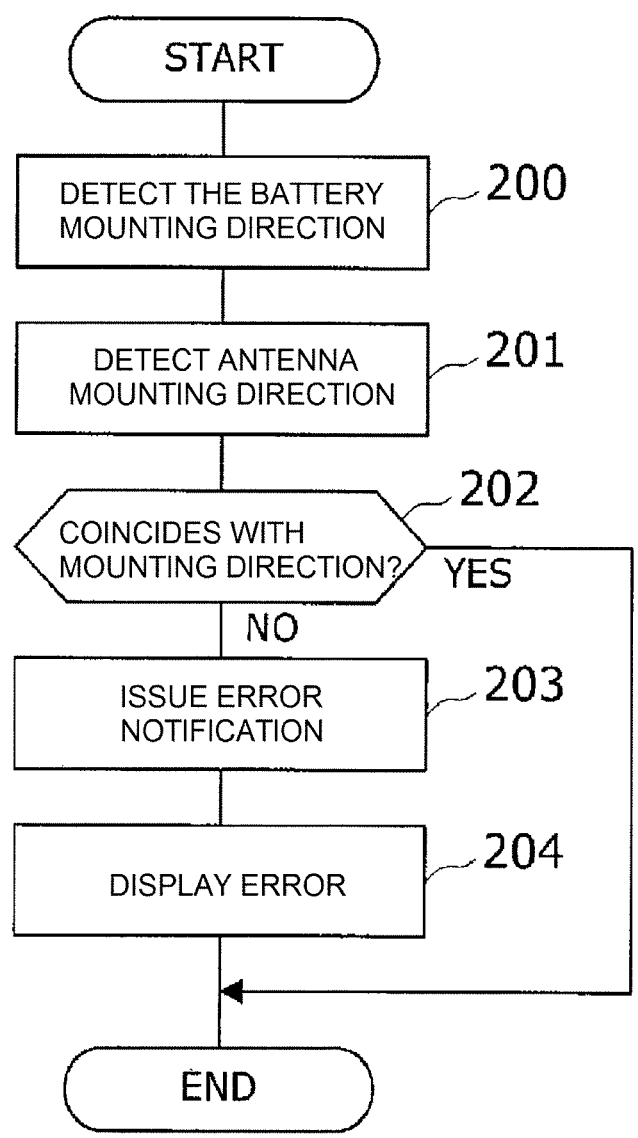
FIG. 13 is a flow chart that shows the battery mounting direction determination process according to the Further Example.

Next, the operation of the field apparatus 10 according to the present example will be explained, referencing FIG. 13.

First, the control unit 13 detects the battery mounting direction based on the actuation states of the detection switches 31A, 31B, 31C obtained from the mounting direction detection unit 12 (i.e., a step 200) and detects the antenna mounting direction based on the actuation states of the detection switches 32A, 32B, 32C obtained from the mounting direction detection unit 12 (i.e., a step 201).

Subsequently, the control unit 13 compares the battery mounting direction and the antenna mounting direction (i.e., a step 202). Here, if the correspondence relationship between the antenna mounting direction and the battery mounting direction shown in FIG. 12 obtains and therefore the battery mounting direction and the antenna mounting direction coincide (i.e., YES in the step 202), then the control unit 13 does not perform the alarm process and terminates the sequence of the battery mounting direction determination process.

However, if the correspondence relationship between the antenna mounting direction and the battery mounting direction shown in FIG. 12 does not obtain and therefore the battery mounting direction and the antenna mounting direction do not coincide (NO in the step 202), then the control unit 13 both transmits an alarm notification from the wireless unit 15 via wireless radio waves (i.e., a step 203) and displays the alarm using the display unit 14 (i.e., a step 204), whereupon the sequence of the battery mounting direction determination process terminates.

Thus, according to the present example, if the antenna 16 is installed in a prefixed direction, then, even if the angles in three axial directions, using the vertical direction as a reference, cannot be detected as explained in the Another Example, it is possible to verify whether there is an error in the mounting direction of the batteries 11 based on the relative mounting direction of the batteries 11 with respect to the field apparatus 10 and the antenna mounting direction with respect to the field apparatus 10.

Accordingly, it is possible to verify whether there is an error in the mounting direction of the batteries 11 even with the low cost detection switches, without the need for the comparatively high cost acceleration sensor.

Another Further Example

Next, the field apparatus 10 according to Another Further Example of the present invention will be explained, referencing FIG. 14A and FIG. 14B.

The Further Example explained an exemplary case wherein whether the battery mounting direction is in the proper mounting direction is verified by detecting the mounting direction of the antenna 16 and comparing that with the battery mounting direction. The present example explains a case wherein whether the battery mounting direction is in the proper mounting direction is verified by detecting the mounting direction of the display unit 14 and comparing that with the battery mounting direction.

Generally, the display unit 14 is often mounted in an upright state in the vertically upward direction in order to maintain satisfactory worker visibility but is not governed by the installation direction of the field apparatus 10. Consequently, if the mounting direction of the display unit 14 is detected, then the vertical direction can be identified and, as a result, the alignment direction that indicates the proper mounting direction P viewed from the field apparatus 10 can be identified.

In the present example, the mounting direction detection unit 12 has a function that detects the display unit mounting direction of the display unit mounted to the apparatus case 21.

The control unit 13 has a function that verifies whether the battery mounting direction is in the proper mounting direction by comparing the display unit mounting direction detected by the mounting direction detection unit 12 and the battery mounting direction.

Figure 14A:
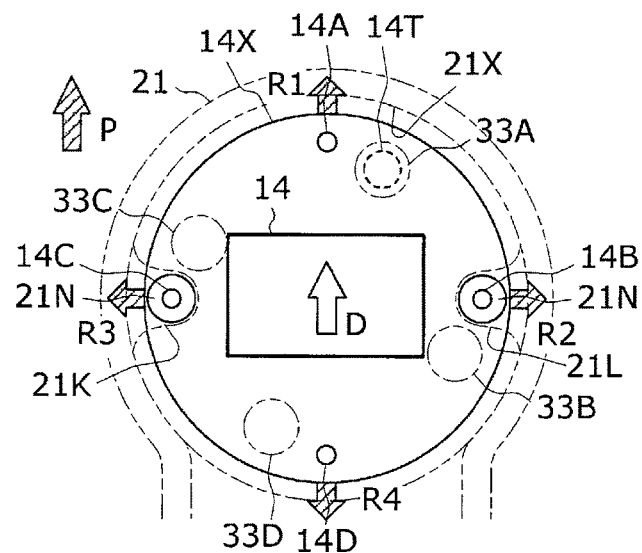
FIG. 14A is a front cross sectional view that shows the principal display unit mounting direction detection parts of the field apparatus according to Another Further Example.
Figure 14B:
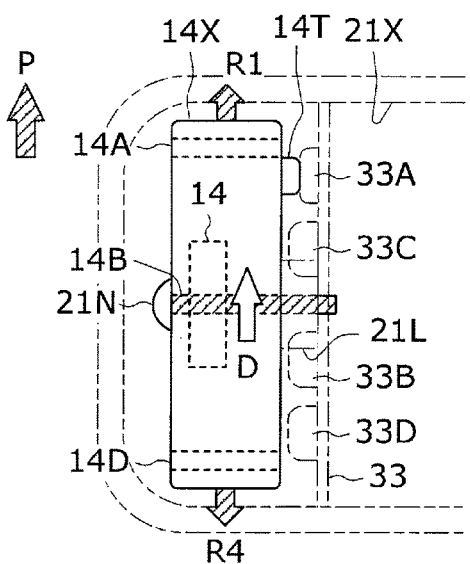
FIG. 14B is a side cross sectional view that shows the principal display unit mounting direction detection parts of the field apparatus according to the Another Further Example.

As shown in FIG. 14A and FIG. 14B, in the present example, the display unit 14 is housed in the display panel 14X. A plurality of holes 14A, 14B, 14C, 14D is formed concyclicly at the peripheral part of the display panel 14X.

Moreover, mounting parts 21K, 21L, which are for mounting the display panel 14X, are provided to the inner wall 21X of the apparatus case 21.

The mounting parts 21K, 21L are formed, as in the mounting parts 21I, 21J, by causing mutually opposing parts of the inner wall 21X to protrude; furthermore, screws 21N, which pass through the holes 14A, 14B, 14C, 14D of the display panel 14X, are screwed through screw holes formed in the mounting parts 21K, 21L, and thereby the display panel 14X is screwed to the inner wall 21X.

Here, the mounting parts 21K, 21L are provided such that they are mutually opposing in the lateral directions of the inner wall 21X, and the four holes 14A, 14B, 14C, 14D corresponding to the mounting parts 21K, 21L are provided in the display panel 14X at mutually orthogonal angles.

Thereby, it is possible to rotate the display panel 14X and mount the display panel 14X to the inner side of the apparatus case 21 at an arbitrary mounting direction by selecting two mutually opposing holes from among the holes 14A, 14B, 14C, 14D that are screwed through to the mounting parts 21K, 21L.

In addition, a protruding part 14T is provided to a surface of the display panel 14X on the mounting parts 21K, 21L side. Moreover, a board 33 (i.e., a PCB) is fixed inside the apparatus case 21 such that it opposes the display panel 14X, and four detection switches 33A, 33B, 33C, 33D, which constitute the mounting direction detection unit 12, are mounted on the board 33.

Each of the detection switches 33A, 33B, 33C, 33D is mounted at a location at which it will contact the protruding part 14T and actuate when the display panel 14X is screwed to the mounting parts 21K, 21L.

Furthermore, other constituent elements of the field apparatus 10 according to the present example are the same as those of the Example, and therefore detailed descriptions thereof are omitted herein. In addition, operation is also the same as that of the Further Example, outside of the fact that, in the step 201 shown in FIG. 13, the display unit mounting direction, instead of the antenna mounting direction, is detected using the detection switches 33A, 33B, 33C, 33D, and therefore a detailed description thereof is omitted herein.

Here, four relative mounting directions, i.e., R1, R2, R3, R4, are defined as the display unit mounting directions with respect to the field apparatus 10.

Namely, the relative mounting direction R1 indicates the direction in which a display unit mounting direction D is oriented in the state wherein the holes 14C, 14B are screwed through to the mounting parts 21K, 21L; in this case, the detection switch 33A is actuated by the protruding part 14T. In addition, the relative mounting direction R2 indicates the direction in which the display unit mounting direction D is oriented in the state wherein the holes 14D, 14A are screwed through to the mounting parts 21K, 21L; in this case, the detection switch 33B is actuated by the protruding part 14T.

Likewise, the relative mounting direction R3 indicates the direction in which the display unit mounting direction D is oriented in the state wherein the holes 14A, 14D are screwed through to the mounting parts 21K, 21L; in this case, the detection switch 33C is actuated by the protruding part 14T. In addition, the relative mounting direction R4 indicates the direction in which the display unit mounting direction D is oriented in the state wherein the holes 14B, 14C are screwed through to the mounting parts 21K, 21L; in this case, the detection switch 33D is actuated by the protruding part 14T.

Figure 9A:
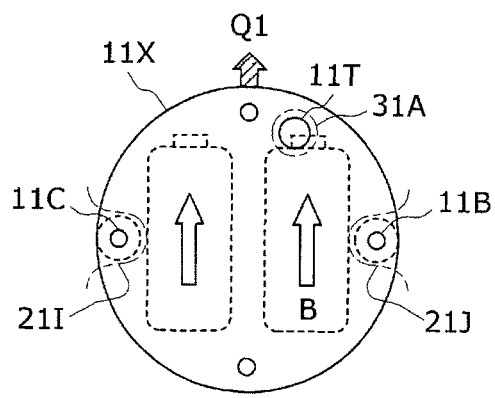
FIG. 9A is an explanatory diagram that shows a relative mounting direction Q1 with respect to an apparatus case.
Figure 15A:
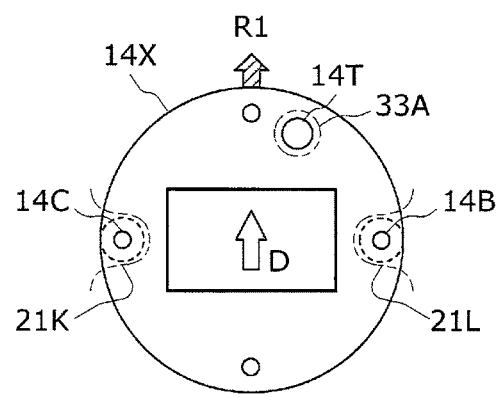
FIG. 15A is an explanatory diagram that shows a relative mounting direction R1 with respect to the apparatus case.

Here, if the direction in which the display unit 14 is oriented is in the proper mounting direction P of the batteries 11, then the display unit mounting direction D is oriented in the relative mounting direction R1 as shown in FIG. 15A if the field apparatus 10 is installed in the upright state. Accordingly, to be mounted in the proper mounting direction P, the batteries 11 clearly should be mounted to the field apparatus 10 in the relative mounting direction Q1 as shown in FIG. 9A discussed above, namely, in the direction coinciding with the relative mounting direction R1.

Figure 9B:
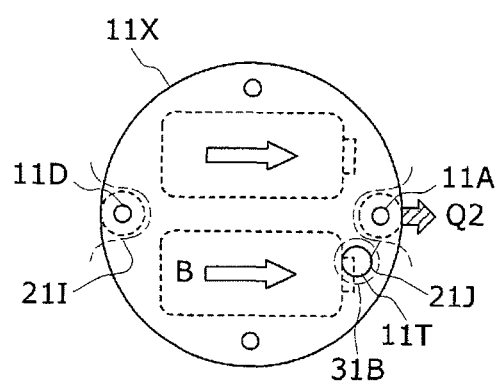
FIG. 9B is an explanatory diagram that shows a relative mounting direction Q2 with respect to the apparatus case.
Figure 15B:
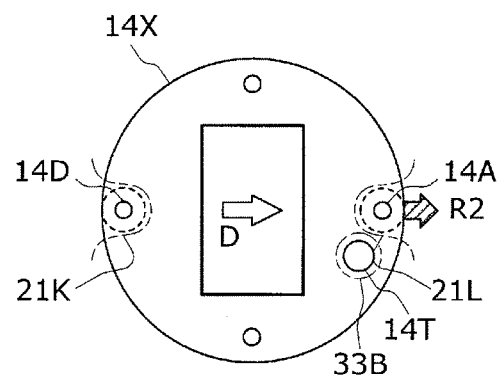
FIG. 15B is an explanatory diagram that shows a relative mounting direction R2 with respect to the apparatus case.

In addition, if the field apparatus 10 is installed in the left sidelong state, then the display unit mounting direction D is oriented in the relative mounting direction R2 as shown in FIG. 15B. Accordingly, to be mounted in the proper mounting direction P, the batteries 11 clearly should be mounted to the field apparatus 10 in the relative mounting direction Q2 as shown in FIG. 9B discussed above, namely, in the direction coinciding with the relative mounting direction R2.

Figure 9C:
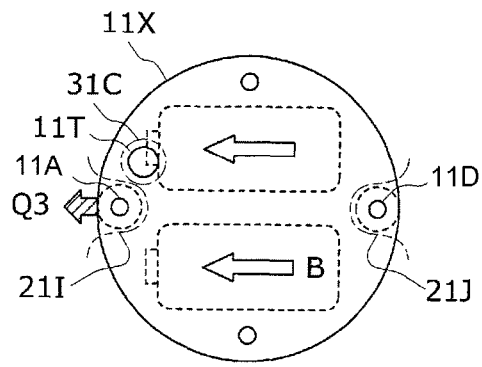
FIG. 9C is an explanatory diagram that shows a relative mounting direction Q3 with respect to the apparatus case.
Figure 15C:
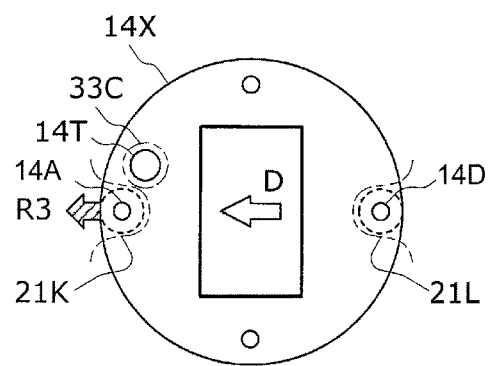
FIG. 15C is an explanatory diagram that shows a relative mounting direction R3 with respect to the apparatus case.

In addition, if the field apparatus 10 is installed in the right sidelong state, then the display unit mounting direction D is oriented in the relative mounting direction R3 as shown in FIG. 15C. Accordingly, to be mounted in the proper mounting direction P, the batteries 11 clearly should be mounted to the field apparatus 10 in the relative mounting direction Q3 as shown in FIG. 9C discussed above, namely, in the direction coinciding with the relative mounting direction R3.

Figure 9D:
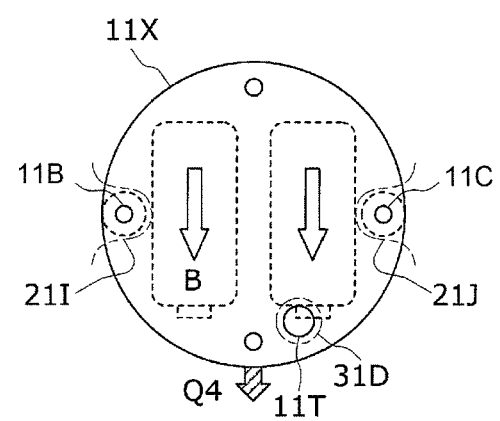
FIG. 9D is an explanatory diagram that shows a relative mounting direction Q4 with respect to the apparatus case.
Figure 15D:
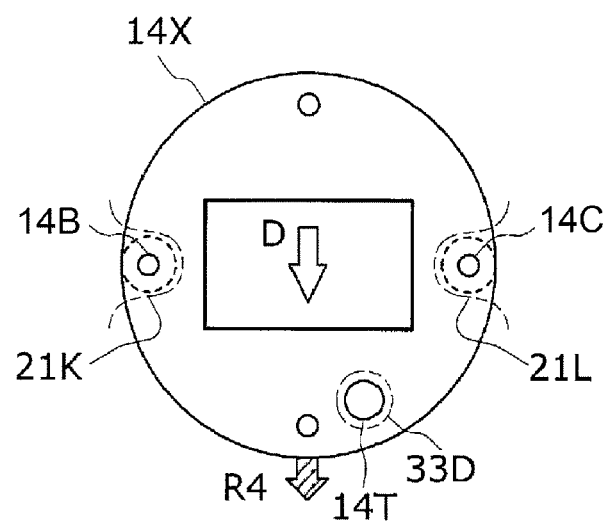
FIG. 15D is an explanatory diagram that shows a relative mounting direction R4 with respect to the apparatus case.

In addition, if the field apparatus 10 is installed in the inverted state, then the display unit mounting direction D is oriented in the relative mounting direction R4 as shown in FIG. 15D. Accordingly, to be mounted in the proper mounting direction P, the batteries 11 clearly should be mounted to the field apparatus 10 in the relative mounting direction Q4 as shown in FIG. 9D discussed above, namely, in the direction coinciding with the relative mounting direction R4.

Accordingly, the control unit 13 can verify whether the battery mounting direction is in the proper mounting direction by comparing, based on a table that describes the correspondence relationship between the display unit mounting direction and the battery mounting direction as shown in FIG. 16, the actuation states of the detection switches 31A, 31B, 31C, 31D that detect the battery mounting direction B of the battery case 11X and the actuation states of the detection switches 33A, 33B, 33C, 33D that detect the display unit mounting direction D of the display panel 14X.

Thus, according to the present example, if the display unit 14 is installed in a prefixed direction, then, even if the angles in three axial directions, using the vertical direction as a reference, cannot be detected as explained in the Another Example, it is possible to verify whether there is an error in the mounting direction of the batteries 11 based on the relative mounting direction of the batteries 11 with respect to the field apparatus 10 and the display unit mounting direction with respect to the field apparatus 10.

Accordingly, it is possible to verify whether there is an error in the mounting direction of the batteries 11 even with the low cost detection switches, without the need for the comparatively high cost acceleration sensor.

Still Further Example

Next, the field apparatus 10 according to Still Further Example of the present invention will be explained, referencing FIG. 17A, FIG. 17B, FIG. 18A, and FIG. 18B.

As discussed above, to maintain the radio wave propagation state in a satisfactory state, the antenna 16 is often provided upright in the vertically upward direction and is not governed by the installation direction of the field apparatus 10. Consequently, for example, the direction in which the antenna 16 is oriented can be set in the proper mounting direction P of the batteries 11. From this viewpoint, the present example explains a case that adopts a configuration wherein, in addition to the configuration described in the Example, the batteries 11 or the antenna 16 are not mounted to the field apparatus 10 if the mounting directions of the batteries 11 and the mounting direction of the antenna 16 do not coincide.

In the present example, the antenna 16 has a protruding part 16K that, in the state wherein the antenna 16 is mounted to the apparatus case 21, protrudes to the inner side of the apparatus case 21.

In addition, the battery case 11X has a recessed part 11K at a location on the outer wall surface of the battery case 11X at which the recessed part 11K mates with the protruding part 16K of the antenna 16 when the battery mounting direction is in the proper mounting direction.

Figure 17A:
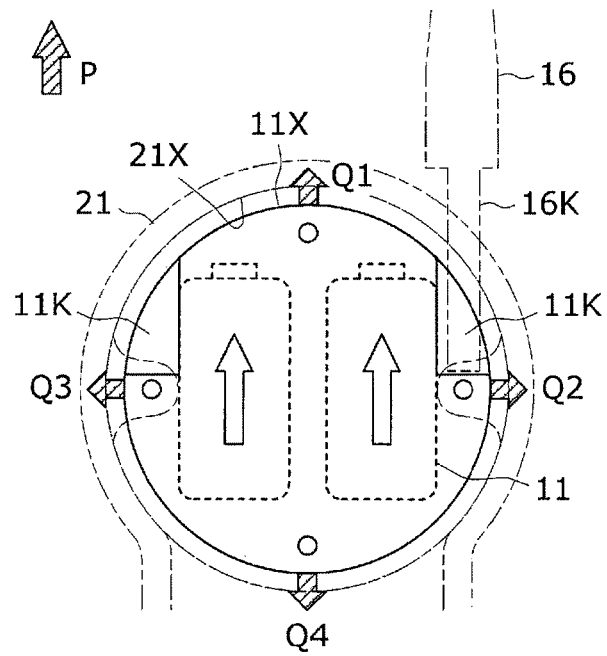
FIG. 17A is a front cross sectional view that shows the principal mounting parts of the batteries and an antenna of the field apparatus according to Still Further Example.
Figure 17B:
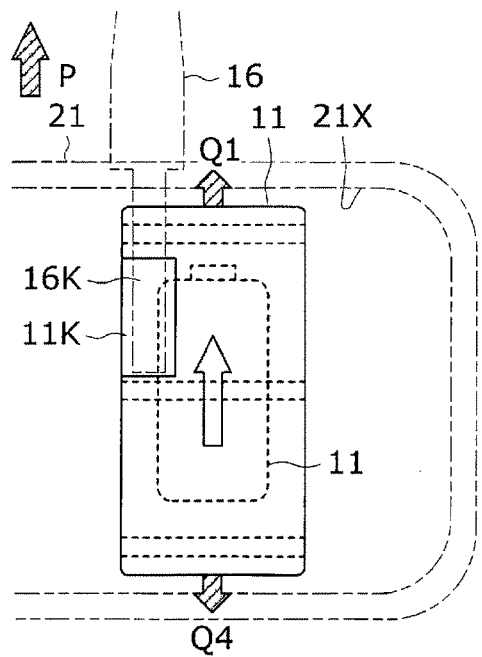
FIG. 17B is a side cross sectional view that shows the principal mounting parts of the batteries and the antenna of the field apparatus according to the Still Further Example.

As shown in FIG. 17A and FIG. 17B, if the field apparatus 10 is installed in a direction other than in the upright state, then the vertically upward direction is in the proper mounting direction P and the antenna 16 is also connected to the apparatus case 21 in the vertically upward direction, namely, along the proper mounting direction P. At this time, the protruding part 16K of the antenna 16 transitions to the state wherein it protrudes to the inner side of the apparatus case 21.

Figure 18A:
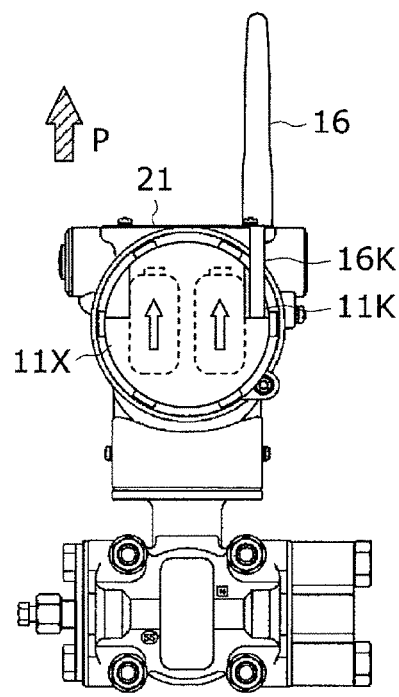
FIG. 18A is an explanatory diagram that shows the mounting direction of the batteries (for the case wherein the field apparatus is installed in the upright state).

Accordingly, as shown in FIG. 18A, if the battery case 11X is mounted in the proper mounting direction P, then the recessed part 11K mates with the protruding part 16K of the antenna 16 mounted in the proper mounting direction P and the battery case 11X does not interfere with the protruding part 16K, which makes it possible to mount the battery case 11X inside the apparatus case 21.

Figure 18B:
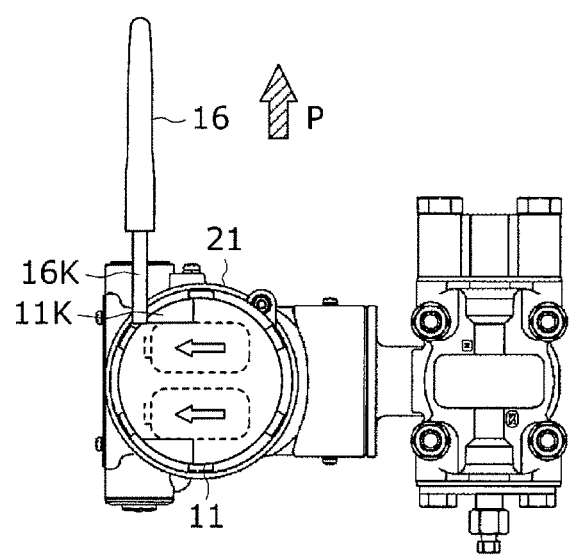
FIG. 18B is an explanatory diagram that shows the mounting direction of the batteries (for the case wherein the field apparatus is installed in the sidelong state).

However, as shown in FIG. 18B, if the battery case 11X is mounted in a direction that differs from the proper mounting direction P, then the battery case 11X interferes with the protruding part 16K of the antenna 16 mounted in the proper mounting direction P. Consequently, if the battery case 11X has already been mounted in the apparatus case 21, then the antenna 16 becomes unmountable in the proper mounting direction P; furthermore, if the antenna 16 has already been mounted in the apparatus case 21, then the battery case 11X cannot be mounted inside the apparatus case 21.

Thus, according to the present example, when mounting the battery case 11X, if the mounting direction of the battery case 11X differs from the proper mounting direction P, then the battery case 11X interferes with the protruding part of the antenna 16, which makes it impossible to mount the battery case 11X inside the apparatus case 21. Accordingly, it is possible to verify whether there is an error in the mounting direction during the battery case 11X mounting procedure without the need for the mounting direction detection unit 12 as explained in the Another Example, Yet Another Example, Further Example and Another Further Example.

Furthermore, if there is an error in the mounting direction of the antenna 16, then the battery case 11X may be mounted inside the apparatus case 21 in a direction that differs from the proper mounting direction P. However, because the antenna 16 is connected to the outside of the field apparatus 10, an error in the mounting direction of the antenna 16 can be discovered extremely easily by a worker and, as a result, such a double error can be avoided easily.

Expansion of the Scope of the Examples

The above explained the present invention referencing the examples, but the present invention is not limited to the abovementioned examples. Variations and modifications in the configuration, the details, and the like of the present invention realizable by a person of skill in the art may be effected within the scope of the present invention.

The invention claimed is:
1. A field apparatus, comprising:
an apparatus case having an opening;
a battery case that houses a battery and is mounted to an inner side of the apparatus case by being inserted into the apparatus case via the opening; and
a mounting part that is provided on the inner side of the apparatus case and mounts the battery case such that its mounting direction can be modified in accordance with the installation direction of the apparatus case such that the battery is in a preset proper mounting direction.
2. The field apparatus according to claim 1, further comprising:
a mounting direction detection unit that detects a battery mounting direction of the battery; and
a control unit that verifies whether the battery mounting direction detected by the mounting direction detection unit is in the proper mounting direction and, if the battery mounting direction differs from the proper mounting direction, issues an alarm.

3. The field apparatus according to claim 2, wherein
the mounting direction detection unit detects the battery mounting direction with respect to the vertical direction based on an output from an acceleration sensor mounted to the battery case; and
the control unit verifies whether the battery mounting direction is in the proper mounting direction by determining whether the battery mounting direction with respect to the vertical direction detected by the mounting direction detection unit includes an angular range that indicates the proper mounting direction.

4. The field apparatus according to claim 2, wherein
the mounting direction detection unit detects, as the battery mounting direction, a relative mounting direction of the battery case with respect to the apparatus case; and
the control unit verifies whether the battery mounting direction is in the proper mounting direction by determining whether the battery mounting direction detected by the mounting direction detection unit is in an alignment direction that indicates the proper mounting direction viewed from the field apparatus.

5. The field apparatus according to claim 4, wherein
the mounting direction detection unit detects an antenna mounting direction of an antenna for wireless communication mounted to the apparatus case; and
the control unit verifies whether the battery mounting direction is in the proper mounting direction by comparing the antenna mounting direction detected by the mounting direction detection unit and the battery mounting direction.

6. The field apparatus according to claim 4, wherein
the mounting direction detection unit detects a display unit mounting direction of a display unit mounted to the apparatus case; and
the control unit verifies whether the mounting direction of the battery is in the proper mounting direction by comparing the display unit mounting direction detected by the mounting direction detection unit and the battery mounting direction.

7. The field apparatus according to claim 1, wherein
an antenna for wireless communication mounted to the apparatus case is provided with a protruding part, which protrudes to the inner side of the apparatus case in the state wherein the antenna has been mounted to the apparatus case, and
the battery case has a recessed part at a location on the outer wall surface of the battery case at which the recessed part mates with the protruding part when the battery mounting direction is in the proper mounting direction.

* * * * *